United States Patent
Bhushan et al.

(10) Patent No.: US 8,170,068 B2
(45) Date of Patent: *May 1, 2012

(54) METHOD, APPARATUS, AND SYSTEM FOR DATA TRANSMISSION AND PROCESSING IN A WIRELESS COMMUNICATION ENVIRONMENT

(75) Inventors: Naga Bhushan, San Diego, CA (US); Raul Hernan Etkin, Albany, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/578,152

(22) Filed: Oct. 13, 2009

(65) Prior Publication Data

US 2010/0091798 A1    Apr. 15, 2010

Related U.S. Application Data

(63) Continuation of application No. 10/775,957, filed on Feb. 9, 2004, now Pat. No. 7,623,553.

(60) Provisional application No. 60/516,996, filed on Nov. 3, 2003.

(51) Int. Cl.
*H04J 3/12* (2006.01)
*H04J 3/00* (2006.01)

(52) U.S. Cl. ............... 370/527; 370/529; 370/332

(58) Field of Classification Search .......... 370/527, 370/487, 486, 485, 332; 455/132, 134, 135, 455/312; 375/295, 316, 324, 341
See application file for complete search history.

(56) References Cited

U.S. PATENT DOCUMENTS

| | | | |
|---|---|---|---|
| 6,574,235 B1 | 6/2003 | Arslan et al. | |
| 6,973,289 B2 | 12/2005 | Ue et al. | |
| 7,028,093 B2 | 4/2006 | Jaenecke et al. | |
| 7,046,678 B2 | 5/2006 | Jiang et al. | |
| 7,047,016 B2 | 5/2006 | Walton et al. | |
| 7,158,804 B2 | 1/2007 | Kumaran et al. | |
| 7,209,524 B2 | 4/2007 | Chen | |
| 7,280,562 B2 | 10/2007 | Sindhushayana et al. | |
| 7,317,750 B2 | 1/2008 | Shattil | |
| 2003/0050074 A1 | 3/2003 | Kogiantis et al. | |
| 2003/0076797 A1 | 4/2003 | Lozano | |
| 2003/0103584 A1 | 6/2003 | Bjerke et al. | |
| 2004/0166869 A1 | 8/2004 | Laroia et al. | |
| 2007/0250638 A1 | 10/2007 | Kiran et al. | |

FOREIGN PATENT DOCUMENTS

| | | |
|---|---|---|
| EP | 1294212 A1 | 3/2003 |
| EP | 1335512 A2 | 8/2003 |
| JP | 9036916 | 2/1997 |
| TW | 475387 U | 2/2002 |

OTHER PUBLICATIONS

Cover, T.M. "Broadcast Channels" IEEE Transactions on Information Theory, IEEE Inc., New York, US, vol. IT-18, No. 1, Jan. 1972, pp. 2-14, XP000760860, ISSN: 0018-9448. International Search Report-PCT/US04/036128, International Search Authority—European Patent Office-May 6, 2005.
Written Opinion - PCT/US04/036128, International Search Authority—European Patent Office—May 6, 2005.
Taiwan Search Report—TW09313301—TIPO—Jul. 15, 2011.

*Primary Examiner* — Hanh Nguyen
(74) *Attorney, Agent, or Firm* — Rupit M. Patel

(57) ABSTRACT

According to one aspect of the present invention, a method is provided in which indications of signal quality associated with each of the plurality of user stations are received. Multiple user stations (e.g., a first user station and a second user station) are selected to receive data from a base station based on the indications of signal quality associated with the plurality of the user stations. A first packet is constructed which contains signaling data for the first user station and application data for the second user station. A second packet which contains application data for the first user station is superimposed upon the first packet. The first and second packets are transmitted simultaneously from the base station to the first and second user stations.

36 Claims, 12 Drawing Sheets

| UT IDENTIFIER | SIGNAL QUALITY INDICATION (E.G. DRC INDEX) | DATA QUEUE INFORMATION | QoS INFORMATION |
|---|---|---|---|
| UT1 | ... | ... | ... |
| UT2 | ... | ... | ... |
| UT3 | ... | ... | ... |
| ... | ... | ... | ... |
| UTk | ... | ... | ... |

FIG. 7

METHOD, APPARATUS, AND SYSTEM FOR DATA TRANSMISSION AND PROCESSING IN A WIRELESS COMMUNICATION ENVIRONMENT

CLAIM OF PRIORITY UNDER 35 U.S.C. §120

The present Application for Patent is a continuation of patent application Ser. No. 10/775,957 entitled, "Method, Apparatus, and System for Data Transmission and Processing in a Wireless Communication Environment", filed Feb. 9, 2004, currently pending, which claims priority to Provisional Application No. 60/516,996 entitled, "Method, Apparatus, and System for Data Transmission and Processing In A Wireless Communication Environment", filed Nov. 3, 2003, now expired, and assigned to the assignee hereof and hereby expressly incorporated by reference herein.

FIELD

The present invention relates generally to the fields of wireless communication and information processing, and more specifically to a method, apparatus, and system for data transmission and processing in a wireless communication environment.

BACKGROUND

In recent years, communication systems' performance and capabilities have continued to improve rapidly in light of several technological advances and improvements with respect to telecommunication network architecture, signal processing, and protocols. In the area of wireless communications, various multiple access standards and protocols have been developed to increase system capacity and accommodate fast-growing user demand. These various multiple access schemes and standards include Time Division Multiple Access (TDMA), Frequency Division Multiple Access (FDMA), Code Division Multiple Access (CDMA), and Orthogonal Frequency Division Multiple Access (OFDMA), etc. Generally, in a system which employs TDMA technique, each user is allowed to transmit information in his assigned or allocated time slots whereas an FDMA system allows each user to transmit information on a particular frequency that is assigned to that particular user. A CDMA system, in contrast, is a spread spectrum system which allows different users to transmit information at the same frequency and at the same time by assigning a unique code to each user. In an OFDMA system, a high-rate data stream is split or divided into a number of lower rate data streams which are transmitted simultaneously in parallel over a number of subcarriers (also called subcarrier frequencies herein). Each user in an OFDMA system is provided with a subset of the available subcarriers for transmission of information.

Code division multiple access (CDMA) technology was introduced in cellular systems in the early 1990s with the development of the IS-95 standard. The IS-95 system has significantly evolved and matured in the last decade resulting in the enhanced revisions IS-95 A and B in 1994 and 1998, respectively. The IS-95-A/B and several related standards form the basis of the second generation cellular technology which is also known as cdmaOne.

The 3G evolution of cdmaOne consists of a family of standards, known as cdma2000, which first appeared with the publication of the IS-2000 Release 0 in 1999. Release A version of IS-2000 was published in mid 2000 with the inclusion of additional signaling support for features such as new common channels, QoS negotiation, enhanced authentication, encryption and concurrent services. The cdma2000 system was designed to be backward compatible with existing cdmaOne networks and voice terminals.

The IS-2000 standard introduces several new features as compared to second-generation (2G) wireless systems. Among those, the introduction of fast forward power control, QPSK modulation, lower code rates, powerful turbo coding, pilot-aided coherent reverse link and support for transmit diversity are considered the major capacity enhancing features in IS-2000.

Even though the IS-2000 standard introduces new features that significantly improve voice capacity and data services, the design was not optimized for high speed IP traffic. As a result, a major addition to cdma2000 was accomplished by the introduction of the high rate packet data (HRPD) system (IS-856) by the end of 2000. The IS-856 standard, also referred to as 1.times.EV-DO herein, is optimized for wireless high-speed packet data services. The IS-856 forward link uses time-division-multiplexed (TDM) waveform, which eliminates power sharing among active users by allocating full sector power and all code channels to a single user at any instant. This is in contrast to code-division-multiplexed (CDM) waveform on the IS-95 forward link, where there is always an unused margin of transmit power depending on the number of active users and power allocated to each user. Each channel (Pilot, Sync, Paging and Traffic channels) in IS-95 is transmitted the entire time with a certain fraction of the total sector power, while the equivalent channel in IS-856 is transmitted, at full power, only during a certain fraction of time.

Due to the TDM waveform of the IS-856 forward link, a terminal is allocated the full sector power whenever it is served, thus no power adaptation is needed. Rather, rate adaptation is used on the IS-856 forward link. In general, the highest data rate that can be transmitted to each terminal is a function of the received SINR from the serving sector. This is typically a time-varying quantity, especially for mobile users. In order to achieve the highest data rate at each time of transmission, each terminal predicts the channel condition over the next packet for its serving sector based on the correlation of the channel states. It selects the highest data rate that can be reliably decoded based the predicted SINR, and then inform the serving sector its selected rate over the reverse link feedback channel. Whenever the network decides to serve a terminal, it transmits at the most recent selected rate fed back from the terminal. This procedure is referred to as closed-loop rate control.

In a system which employs TDM scheduling for transmission from a base station to user terminals or user stations (e.g., the current 1.times.EV-DO downlink or forward link transmission), the base station transmits a single packet to a particular user at any given time. As shown in FIG. 1, different users are time-division multiplexed, i.e., served at different points in time. In order to maintain fairness, the system spends a significant amount of time serving users with low SINR. The TDM scheduling forces the base station to allocate bandwidth among different users in the same proportion in which it allocates its transmit power to different users. While users in poor coverage require a large share of base station transmit power, they need only a small fraction of the bandwidth. While the users with low SINR are being served, the system bandwidth is unnecessarily wasted or underutilized. As a result, the system throughput is significant reduced by the presence of a few users with low SINR (poor coverage).

One approach to addressing the above problem is to use the CDM approach, which is to allocate a variable number of code channels to different users, and apply power control to the transmission to multiple users in order to maintain a reliable link to each user. This approach, however, requires dynamic allocation of code channels to different users, as well as the need to control the power of the different users rapidly enough to track channel variation. Moreover, it turns out that any form of bandwidth-partitioning among multiple users on the downlink is sub-optimal, from the viewpoint of throughput optimization. As a result, the CDM approach does not provide as much gain in system throughput.

There is therefore a need in the art for a method, apparatus, and system for efficient data transmission and processing in a wireless communication environment to improve system throughput and bandwidth utilization.

SUMMARY

According to one aspect of the present invention, a method is provided in which indications of signal quality associated with each of the plurality of user stations are received. A first user station and a second user station are selected to receive data from a base station based on the indications of signal quality associated with the plurality of the user stations. A first packet is constructed which contains signaling data for the first user station and application data for the second user station. A second packet which contains application data for the first user station is super-imposed upon the first packet. The first and second packets are transmitted simultaneously from the base station to the first and second user stations.

BRIEF DESCRIPTION OF THE DRAWINGS

FIG. 7 shows an example of a table containing the various selection/scheduling criteria, in accordance with one embodiment of the present invention;

DETAILED DESCRIPTION

Figure 1:
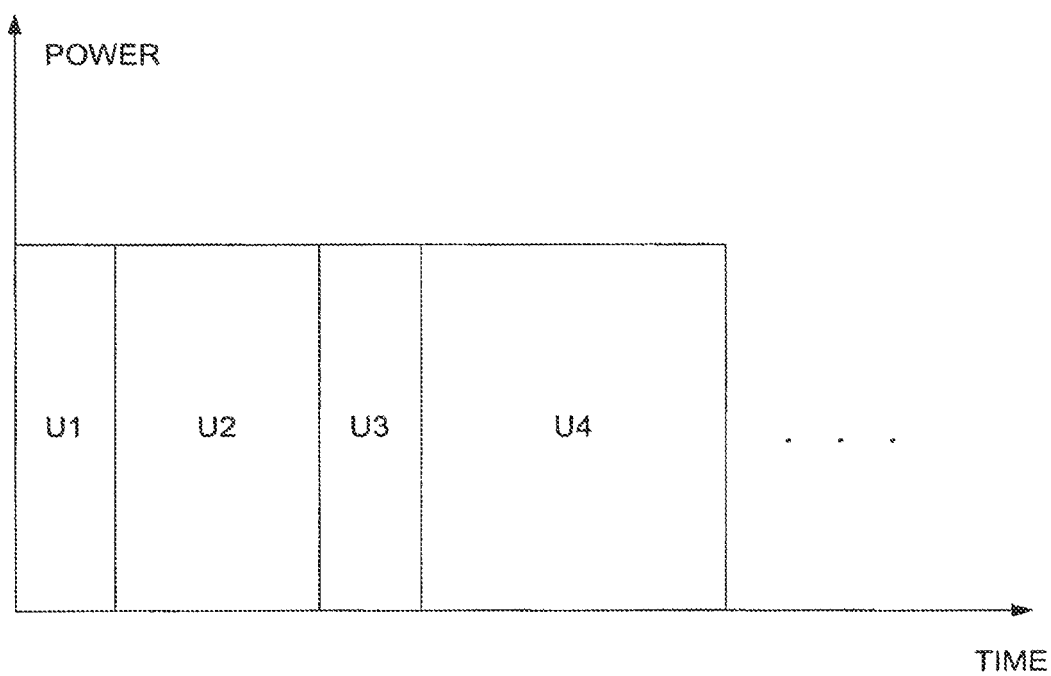
FIG. 1 is a diagram illustrating a conventional TDM scheduling configuration.

The word "exemplary" is used herein to mean "serving as an example, instance, or illustration." Any embodiment described herein as "exemplary" is not necessarily to be construed as preferred or advantageous over other embodiments.

In accordance with various embodiments of the present invention described in details below, the inefficiency associated with TDM scheduling can be avoided by serving multiple users (e.g., two users) at a time, one user with high signal quality level (e.g., high SINR) and another user with low signal quality level (e.g., low SINR), using a technique known as superposition coding. Employing superposition coding and scheduling improve the system throughput considerably, without depriving the users with low SINR of their fair share of system resources and throughput.

While the various examples provided herein are directed to a CDMA-based system such as an IS-856 system, it should be understood and recognized by one skilled in the art that the teachings of the present invention can be applied to any communication system which employs TDM scheduling, CDM scheduling, or combinations thereof. According to one embodiment of the invention, in a system which includes a base station serving multiple user terminals or user stations, the base station may select either a single user or multiple users (e.g., a pair of users) to serve at any given moment. If the base station selects a single user to serve, it operates just like the current TDM system. If the base station selects a pair of users to serve, a "multi-user" packet (first packet) is constructed at a low enough data rate so that both users can demodulate. Another packet (second packet) intended for just one of the two users is super-imposed upon the "multi-user" packet. The second packet is coded in such a manner that it behaves like random interference to the multi-user packet. In one embodiment, a "multi-user" packet is a single physical layer packet which contains higher layer payloads belonging to more than one user. The higher layer payload addressed to the low SINR user contains application data for that user. The higher layer payload addressed to the high SINR user contains signaling data for the high SINR user. In one embodiment, the signaling data indicates the coding/modulation parameters of another physical layer packet that is simultaneously being transmitted to the high SINR user. Upon receipt of the signaling data embedded in the multi-user packet, the high SINR user subtracts the contribution of the multi-user packet from the received signal, and uses the resulting signal to extract the second packet, whose encoding parameters were specified by the signaling data. Thus, the low SINR user is served by the bulk of the multi-user packet, while the high SINR user is served by the second packet that was superimposed on the multi-user packet. Superposition coding and scheduling in accordance with various embodiments of the present invention are described in greater detail below.

Time-Division-Multiplexed (TDM) Scheduling:

The following concepts and principles are discussed with respect to a communication system which includes one transmitter (e.g., a base station) and multiple receivers (e.g., user terminals or user stations, etc.). Let $\gamma_k$ denote the channel SNR of the $k^{th}$ user station (also called $k^{th}$ user herein). Channel SNR of a user can be defined as the SNR of the data symbols received by that user, if the base station transmits to that user at full power. Let $C(\gamma)$ represent the function that maps the data symbol SNR .gamma. to the maximum supportable data rate. The maximum supportable data rate is upper bounded by the Shannon capacity of an AWGN channel with that SNR. i.e., $C(\gamma) \leq W \log(1+\gamma)$. It should be noted that $C(\gamma)$ is an increasing function of the SNR.

For a TDM scheduler that serves the $k^{th}$ user for a fraction $\alpha_k$ of the total time, the effective data rate of the $k^{th}$ user is given by $R_k = \alpha_k C(\gamma_k)$. Accordingly, the rate region of the TDM scheduler with N users can be defined as the set of all achievable rates of all users in the system, given by:

$$\{(\alpha_1 C(\gamma_1), \alpha_2 C(\gamma_2), \ldots, \alpha_N C(\gamma_N)) \mid \alpha_i \geq 0, \sum_{i=1}^{N} \alpha_i \leq 1\}$$

TDM Schedulers with different fairness criteria operate at different points in the rate region described above. For example, an equal-GOS scheduler may select the time fractions $\alpha_k$ such that all users have the same effective data rate $R_{eq}$. More specifically, an equal-GOS scheduler may select $$\alpha_k = \frac{C(\gamma_k)^{-1}}{\sum_{i=1}^{N} C(\gamma_i)^{-1}}, \text{ so that } R_k = \frac{1}{\sum_{i=1}^{N} C(\gamma_i)^{-1}} \equiv R_{eq}.$$

The total throughput of the system is given by the harmonic mean $$R_{tot} \equiv \sum_{k=1}^{N} R_k = \frac{N}{\sum_{i=1}^{N} C(\gamma_i)^{-1}}.$$

On the other hand, an equal-time scheduler may select $$\alpha_k = \frac{1}{N},$$

so that the effective rate of the $k^{th}$ user is given by $$R_k = \left(\frac{1}{N}\right) C(\gamma_k).$$

and the total system throughput is given by the arithmetic mean $$R_{tot} \equiv \sum_{k=1}^{N} R_k = \frac{1}{N} \sum_{k=1}^{N} C(\gamma_k).$$

The proportional-fair scheduler, which tries to maximize the sum of the logarithmic data rates $$\sum_{k=1}^{N} \log(R_k)$$

also coincides with the equal-time scheduler, for the time-invariant (static) channel considered above.

So far, it has been assumed that the channel is static, i.e., that the channel SNR of the users do not change with time. If the channel is time varying, the SNR of the users change with time and a dynamic scheduler may be needed that exploits the channel variations. A dynamic TDM scheduler may pick a user to serve at each time slot, depending on the history the SNR of all the users up to that time. Suppose $T_k[n]$ is the throughput of the $k^{th}$ user at time slot n. Let U(T) denote the utility function associated with throughput T. The objective of the scheduler is to maximize the total utility function $$\sum_{k=1}^{N} U(T_k[n])$$

at each time slot n. It should be noted that the proportional-fair scheduler is a special case, where the utility function is logarithmic.

Given the above objective, the utility-maximizing dynamic TDM scheduler operates as follows: at the $(n+1)^{th}$ time slot, the TDM scheduler picks a user with index k, where k is maximizes the expression $$\Delta_k \equiv U((1-\beta)T_k[n]+\beta C(\gamma_k[n]))-U((1-\beta)T_k[n])=\beta U'((1-\beta)T_k[n])C(\gamma_k[n]),$$

where $\beta$ is inversely related to the duration over which the throughput $T_k$ is averaged. In the special case of proportional-fair scheduler, the scheduler picks that user with index k, where k maximizes the expression $$\Delta_k \approx \frac{\beta}{(1-\beta)} \frac{C(\gamma_k[n])}{T_k[n]}.$$

Once the scheduler picks the user k who is served during the nth time slot, the throughput of all the users are updated using the equations:

$$T_k[n+1]=(1-\beta)T_k[n]+\beta C(\gamma_k[n]), T_i[n+1]=(1-\beta)T_i[n]$$
$$i \neq k.$$

Superposition Coding:

The idea of superposition coding which entails superimposing high rate information on low rate information was first discussed by T. Cover, Broadcast Channels, IEEE Transactions on Information Theory, Vol. IT-18, No. 1, January 1972.

For a given set of channel SNR of the N users, superposition coding can be used to enlarge the rate region associated with TDM scheduling. If the users are indexed in the decreasing order of their SNR, and if the base station spends a fraction of its power $\alpha_k$ on the data destined to the $k^{th}$ user, then the set of user data rates is given by $$R_k = C\left(\frac{\alpha_k}{\gamma_k^{-1} + \sum_{i=1}^{k-1} \alpha_i}\right), k = 1, 2, \ldots, N.$$

In one embodiment, the above date rates can be achieved as follows. The base station encodes the $k^{th}$ user's packet as the codeword $c_k$ at the data rate $R_k$ given above. The base station transmits the signal $$x = \sum_{k=1}^{N-1} \sqrt{\alpha_k} \, s_k * c_k + \sqrt{\alpha_N} \, c_N,$$

where * denotes the scrambling operation with a pseudo-random sequence $s_k$. The scrambling operation is performed to ensure that the different users' code words appear random relative to each other. At the receiver of the $k^{th}$ user, the signal $y=x+n_k$ is received, where $n_k$ represents the additive noise from the channel. The $k^{th}$ user first decodes the codeword $c_N$, which experiences an $$SINR \frac{\alpha_N}{\gamma_k^{-1} + \sum_{i=1}^{N-1} \alpha_i} \geq \frac{\alpha_N}{\gamma_N^{-1} + \sum_{i=1}^{N-1} \alpha_i},$$

which holds because $\gamma_k \geq \gamma_N$ by assumption. Since the rate function $C(.)$ is monotonically increasing of the SNR, it follows that $$C\left(\frac{\alpha_N}{\gamma_k^{-1} + \sum_{i=1}^{k-1} \alpha_i}\right) \geq C\left(\frac{\alpha_k}{\gamma_k^{-1} + \sum_{i=1}^{k-1} \alpha_i}\right) = R_N.$$

In other words, the SNR of the $N^{th}$ codeword $c_N$ at the $k^{th}$ receiver is strong enough to be decoder by the $k^{th}$ user. Once, the $N^{th}$ codeword is decoded, the $k^{th}$ user re-encodes the $N^{th}$ user's packet, and cancels its contribution from the received signal, and descrambles the received signal with respect to the scrambling sequence $s_{N-1}$. The resulting signal may be expressed as follows:

$$\sum_{i=1}^{N-1} \sqrt{\alpha_i}\, s_{N-1}^{-1} * s_i * c_i + s_{N-1}^{-1} * n_k =$$

$$\sqrt{\alpha_{N-1}}\, c_{N-1} + \sum_{i=1}^{N-2} \sqrt{\alpha_i}\, s_{N-1}^{-1} * s_i * c_i + s_{N-1}^{-1} * n_k.$$

Then the $(N-1)^{th}$ codeword has an $$SINR \frac{\alpha_{N-1}}{\gamma_k^{-1} + \sum_{i=1}^{N-2} \alpha_i} \geq \frac{\alpha_{N-1}}{\gamma_{N-1}^{-1} + \sum_{i=1}^{N-1} \alpha_i} = C^{-1}(R_{N-1}).$$

Based on the equation described above, it follows that the $(N-1)^{th}$ codeword may be successfully decoded by the $k^{th}$ user, if $k \leq (N-1)$. Similarly, the $k^{th}$ user decodes the packets $c_N, c_{N-1}, \ldots, c_{k+1}$ and $c_k$ through successive cancellation, and eventually recovers the data intended for it.

The rate region associated with superposition coding is significantly larger than that associated with TDM scheduling, when the system has some users at very high SNRs, and some other users at very low SNRs. If all users have nearly the same SNR, then the two rate regions are very similar or nearly identical.

Superposition Coding Scheduler:

Unlike the TDM scheduler which is constrained to serve one user at a time, a scheduler which employs superposition coding techniques (also called superposition coding scheduler herein) can serve more than one users at a time, or indeed all the N users at the same time. The superposition coding scheduler needs to select a power fraction allocated to the different users at any given time. By setting the power fraction allocated to certain users to zero, it may serve only a subset of users at any given time. As described herein, system bandwidth may be better utilized for a superposition coding scheduler to serve just two users at any given time, one with a very high channel SNR, and the other with a very low channel SNR.

In any case, the superposition scheduler operating on a time varying channel may select the power fractions $\{\alpha_k\}$ that maximize the incremental utility function $$\Delta(\{\alpha_k\}) \equiv \sum_{k=1}^{N} \left[ U\left((1-\beta)T_k[n] + \beta C\left(\frac{\alpha_k}{\gamma_k^{-1} + \sum_{i=1}^{k-1}\alpha_i}\right)\right) - U((1-\beta)T_k[n]) \right]$$

$$= \sum_{\substack{k=1,\\ \alpha_k>0}}^{N} \left[ U\left((1-\beta)T_k[n] + \beta C\left(\frac{\alpha_k}{\gamma_k^{-1} + \sum_{i=1}^{k-1}\alpha_i}\right)\right) - U((1-\beta)T_k[n]) \right]$$

$$= \beta \sum_{\substack{k=1,\\ \alpha_s>0}}^{N} U'((1-\beta)T_k[n])C\left(\frac{\alpha_k}{\gamma_k^{-1} + \sum_{i=1}^{k-1}\alpha_i}\right)$$

subject to the constraints $$\alpha_i \geq 0, \sum_{i=1}^{N} \alpha_i \leq 1.$$

In the special case of proportional-fair scheduler, the last expression reduces to $$\Delta(\{\alpha_k\}) = \frac{\beta}{1-\beta} \sum_{\substack{k=1,\\ \alpha_k>0}}^{N} T_k[n]^{-1} C\left(\frac{\alpha_k}{\gamma_k^{-1} + \sum_{i=1}^{k-1}\alpha_i}\right).$$

As noted before, the scheduler may adopt additional constraints, such as at most two (or in general, at most M<N) of the power fractions $\alpha_i$ are non-zero.

Accordingly, the user throughput is updated using the equations $$T_k[n+1] = (1-\beta)T_k[n] + \beta C\left(\frac{\alpha_k}{\gamma_k^{-1} + \sum_{i=1}^{k-1}\alpha_i}\right).$$

While significant improvements in system throughput may be achieved by superposition coding and scheduling (SC), there are a number of practical considerations that may limit the performance gains in a real system as explained below:

Channel model: real wireless systems experience time varying fading, which is often modeled as a Rayleigh or Ricean process. In the presence of fading one can obtain multi-user diversity gains by scheduling a user when his channel is strong. For channels that offer large multi-user diversity gains, superposition coding may not provide significant performance improvements. Therefore one should expect to see larger benefits of SC in Ricean channels with a large K factor, than in Rayleigh faded channels.

Asymmetry between users: as explained above, superposition coding and scheduling can provide significant system performance improvement when the users have very asymmetric channels. In practice, the level of asymmetry may be limited by various practical system constraints. For example, the receiver front end may impose a maximum SINR (e.g., 13 dB in a system such as 1.times.EV-DO). In addition, a minimum required SINR may be imposed for the transmission at the lowest possible rate (e.g., −11.5 dB in 1.times.EV-DO system). These constraints therefore limit the SINR span of any 2 users. Furthermore, there is a finite number of users in each sector, all of which need to be served in a fair way. This factor may further limit the possible choice of pairs of users. Accordingly, it may not always be possible to schedule 2 users with very asymmetric channel conditions.

Non-ideal interference cancellation: it has been assumed that the signal of the weak user (e.g., the user with low SNR) could be completely removed from the received signal of the strong user (e.g., the user with high SNR). This requires almost perfect knowledge of the channel fading gain of the strong user, and almost perfect decoding of the weak user packet. In practice, the channel fading coefficient is estimated, and channel estimation error adds a noise term that degrades the channel SINR. Furthermore, even assuming that perfect decoding of the weak user packet may be performed, non-negligible decoding delay may produce hybrid ARQ losses for the strong user.

Coding: the AWGN results used Gaussian channel capacity to evaluate performance. In practice, the system has a finite set of modulation schemes and coding rates, and therefore there is less freedom in the choice of rate pairs and power allocations.

Figure 2:
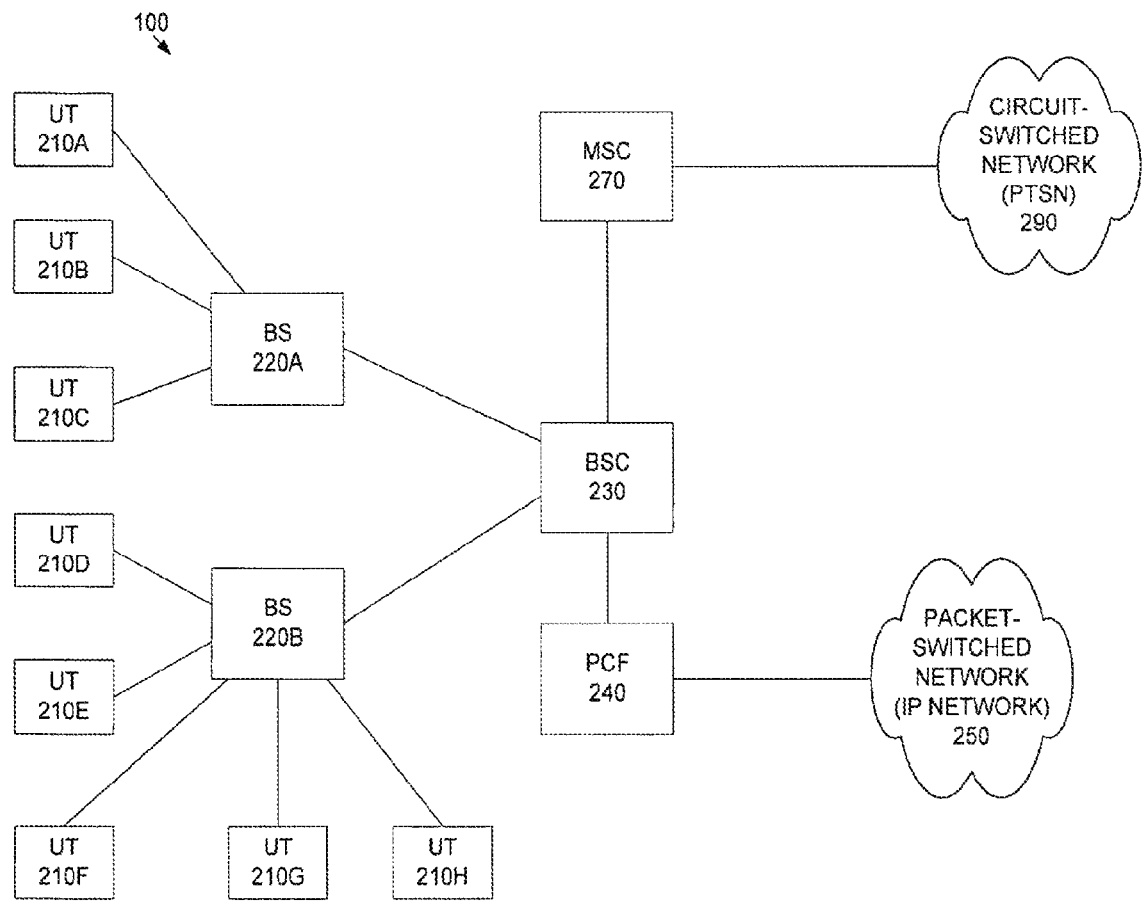
FIG. 2 is a block diagram of a communication system in which the teachings of the present invention are implemented.

Continuing with the present description, FIG. 2 is a block diagram of a communication system 200 in which the teachings of the present invention are implemented. As shown in FIG. 2, the system 200 includes various user terminals (UT) 210 and base stations (BS) 220. User terminals 210 are also referred to as user stations, remote stations, subscriber stations, or access terminals herein. The user terminals 210 can be mobile (in which case they may also be referred to as mobile stations) or stationary. In one embodiment, each base station 220 can communicate with one or more user terminals 210 on a communication link called forward link. Each user terminal 210 can communicate with one or more base stations 220 on a communication link called reverse link, depending on whether the respective user terminal 210 is in soft handoff. As shown in FIG. 2, the system 200 further includes a base station controller (BSC) 230 to coordinate and control data communication between the user terminals 210 and the base stations 220. As shown in FIG. 2, the base station controller 230 may be connected to a circuit-switched network (e.g., PSTN) 290 through a mobile switching center (MSC) 270 and/or a packet-switched network (e.g., IP network) 250 via a packet data service node 240 (also referred to as packet network interface herein). As described herein, in one embodiment, each base station 220 may include a scheduler (not shown) to coordinate and schedule data transmissions from the respective base station 220 to the various user terminals 210 that are served by the respective base station 220. In another embodiment, the scheduler may be implemented within the BSC 230 to coordinate and schedule data transmissions for all base stations 220 that are connected to the BSC 230. In other words, the location of the scheduler may be chosen depending upon whether a centralized or distributed scheduling processing is desired.

Figure 3:
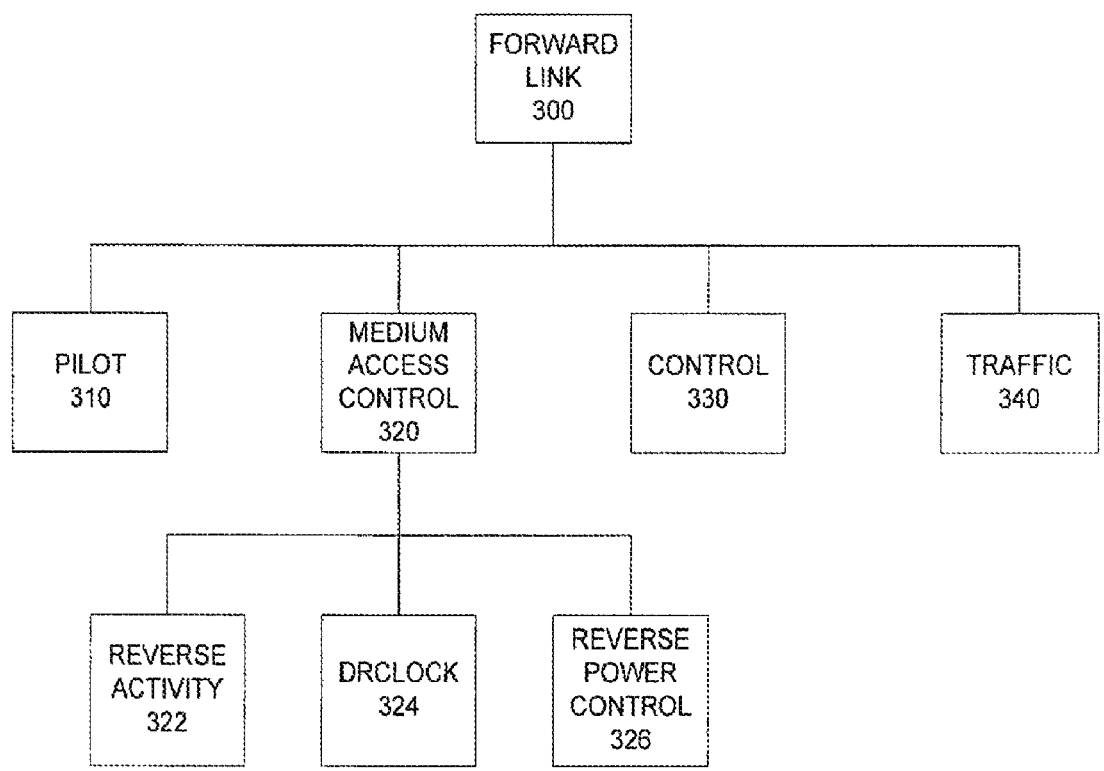
FIG. 3 is a diagram illustrating a structure of the forward link.

FIG. 3 is a diagram illustrating a structure of the forward link 300, in accordance with one embodiment of the present invention. As shown in FIG. 3, the forward link 300 includes pilot channel 310, medium access control (MAC) channel 320, control channel 330, and traffic channel 340. The MAC channel 320 includes three subchannels: reverse activity (RA) channel 322, DRCLock channel 324, and reverse power control (RPC) channel 324.

Figure 4:
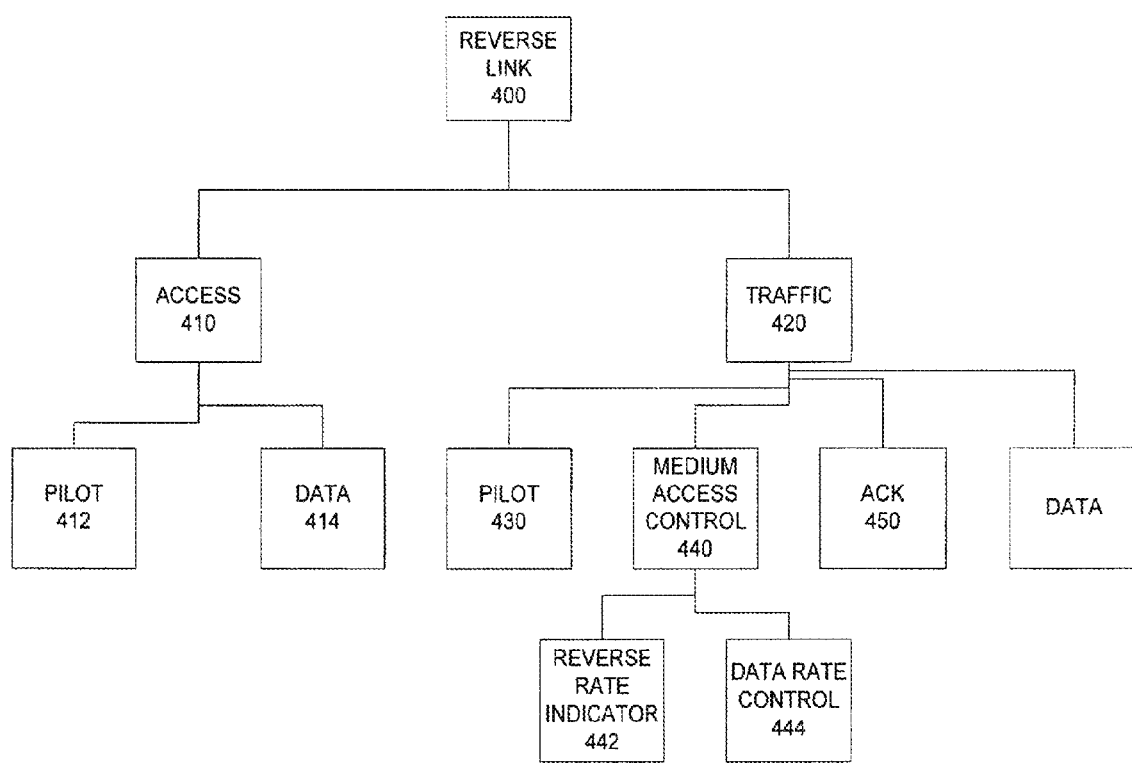
FIG. 4 is a diagram illustrating a structure of a reverse link.

FIG. 4 is a diagram illustrating a structure of a reverse link, in accordance with one embodiment of the present invention. As shown in FIG. 4, the reverse link 400 includes access channel 410 and traffic channel 420. The access channel 410 includes a pilot channel 412 and a data channel 414. The traffic channel 420 includes a pilot channel 430, a medium access control (MAC) channel 440, acknowledgement (ACK) channel 450, and data channel 460. The MAC channel 440, in one embodiment, includes a reverse rate indicator (RRI) channel 442 and data rate control (DRC) channel 444.

Figure 5:
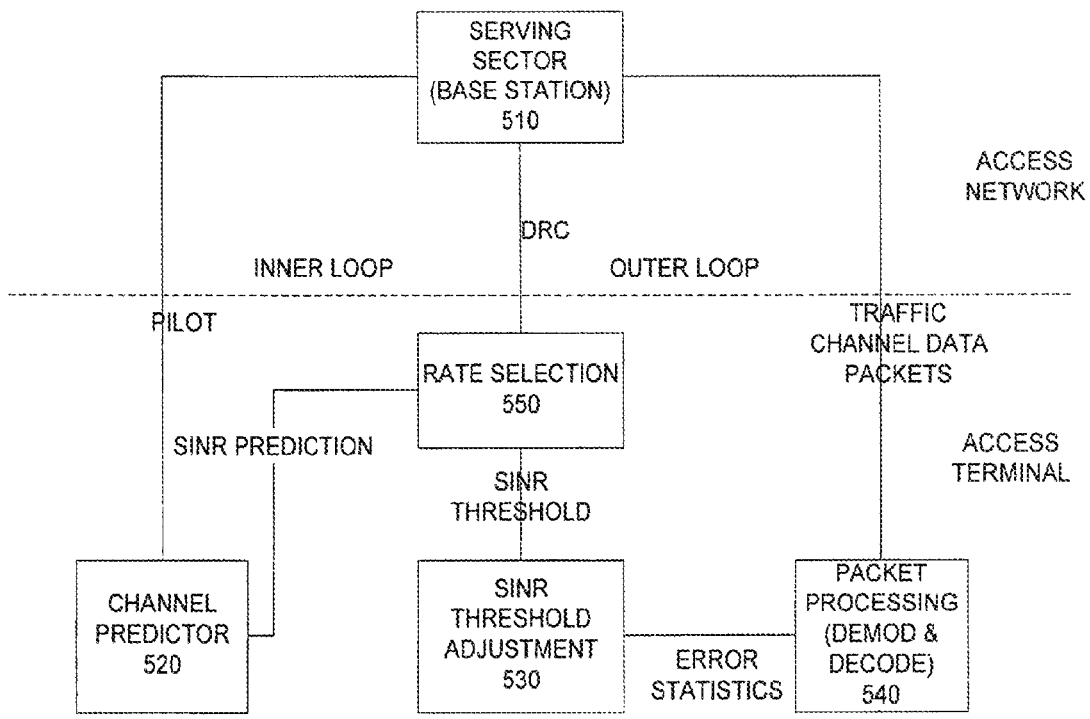
FIG. 5 is a block diagram showing a rate control configuration according to one embodiment of the invention.

FIG. 5 is a block diagram showing a rate control configuration implemented in the system shown in FIG. 1, according to one embodiment of the invention. Rate control may also be referred to as link adaptation herein. Basically, rate control or link adaptation refers to the process of allocating or changing the transmission rate in response to channel variations (e.g., changes in signal quality received at the user terminal). In a system configuration as shown in FIG. 2, the base stations or sectors transmit pilot signals on the pilot channel of the forward link. The user terminals measure the SINR of the pilot signals received from the base stations and predict the SINR for the next packet based on the measured SINR. The user terminals then request the highest transmission rate that they can decode based on the predicted SINR for a given error performance (e.g., a packet error rate (PER)). The rate requests therefore correspond to the signal quality level of data received at the user terminals. The rate requests are sent on the DRC channel on the reverse link to the respective base stations. As described herein, the rate requests or DRC information are used by the scheduler in accordance with one embodiment of the invention to perform the scheduling functions (e.g., selecting the appropriate user terminals to receive data transmission from the base station at any given moment).

As shown in FIG. 5, the rate control or link adaptation scheme employed in accordance with one embodiment of the present includes an inner loop and an outer loop. The pilot signals transmitted from the base station or serving sector 510 are received at the user terminal The channel predictor unit 520 measures the received pilot SINR and predicts the SINR for the next packet. SINR prediction is provided to the rate selection unit 550 which selects the highest data rate (DRC) subject to a threshold PER. In one embodiment, as the base station decides to serve a particular user terminal with traffic data, the base station transmits data to the user terminal at the rate indicated by the most recently received DRC from the terminal. The outer loop adjusts the SINR thresholds of the data rates based on the error rate of the forward traffic channel physical layer packets. As shown in FIG. 5, the packet processing unit 540 provides error statistics (e.g., CRC statistics) to the SINR threshold adjustment unit 530 which adjusts the SINR thresholds based on the error statistics and provides the SINR threshold information to the rate selection unit 550. It should be understood by one skilled in the art that the rate control scheme illustrated in FIG. 5 is just one example of various rate control schemes that may be implemented. Similarly, the use of the DRC channel to convey a measurement of the channel SINR is just one example of various ways to provide signal quality measurements from the user terminals to the serving base station. For example, in various embodiments, signal quality measurements corresponding to the channel conditions (e.g., channel SINR) may be quantized and provided to the base stations on a different channel. Table 1 illustrates an exemplary mapping between the various DRC indices, SINRs, and transmission rates to achieve a certain packet error rate (e.g., 1% packet error rate).

TABLE 1

| Rate (bps) | DRC Index | SINR Threshold (dB) |
|---|---|---|
| 2.456 M | 12 | 9.7 |
| 1.843 M | 11 | 7.5 |
| 1.228 M | 10 | 3.8 |
| 1.228 M | 9 | 3.7 |
| 921.6 K | 8 | 1.8 |
| 614.4 K | 7 | −0.8 |
| 614.4 K | 6 | −0.6 |
| 307.2 K | 5 | −3.8 |
| 307.2 K | 4 | −3.9 |
| 153.6 K | 3 | −6.8 |
| 76.8 K | 2 | −9.6 |
| 38.4 K | 1 | −12 |

Figure 6:
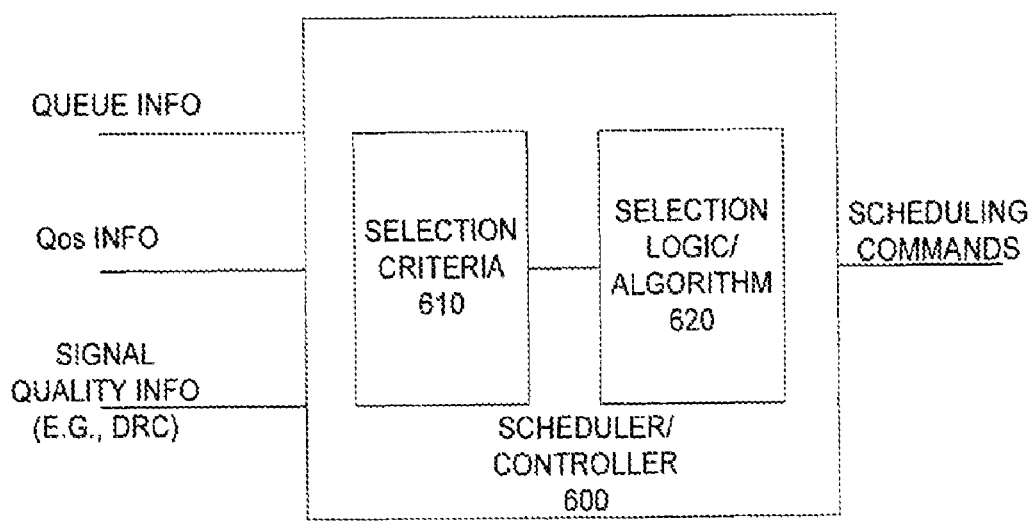
FIG. 6 shows a block diagram of a scheduler/controller in accordance with one embodiment of the present invention.

FIG. 6 shows a block diagram of a scheduler 600 in accordance with one embodiment of the present invention. As mentioned above, the scheduler may be located in the base station or the base station controller, depending upon the particular implementations and applications of the present invention. As shown in FIG. 6, the scheduler 600 is configured to receive signal quality information (e.g., DRC messages) from the various user terminals. In one embodiment, the scheduler also receives other types of information such as queue information and quality of service (QoS) information associated with the various user terminals being served by the respective base station(s). For example, the queue information associated with the various user terminals may indicate the amount of data waiting to be transmitted from the base station to the respective user terminals. QoS information may be used to indicate various QoS requirements associated with the user terminals. For example, QoS information may be used to indicate the level of service that a respective user terminal is associated with, latency requirements, transmission priority, etc. An example of a table 700 containing the various selection/scheduling criteria that may be used by the scheduler 600 in performing its corresponding scheduling functions is shown in FIG. 7, in accordance with one embodiment of the present invention. As shown in FIG. 7, each entry in the table 700 may include a user terminal identifier and the associated signal quality indicator (e.g., DRC index). Table 700 may further includes other types of information associated with the user terminals such as queue information and QoS information that may also be used by the scheduler to perform the scheduling functions.

In one embodiment, the various types of information provided to the scheduler 600 may be used by the scheduler 600 as selection/scheduling criteria 610 to select the user terminals for receiving data transmissions from the serving base station(s). As shown in FIG. 6, the various selection/scheduling criteria 610 are inputted to the selection/scheduling unit 620 to select the particular user terminals to receive data transmission from the serving base station(s) at any given moment. The various scheduling methods and algorithms used in various embodiments of the present invention are described in details below.

In one embodiment, to implement superposition coding and scheduling in a multi-user system such as the system shown in FIG. 2 above, the scheduler 600, for each time interval or time slot, selects two users to receive data transmissions from the base station and the corresponding power allocation .alpha. In one embodiment, the choice of users and power allocation is done in such a way as to maximize a given performance metric. For example, the proportional fair scheduler used in a system such as 1.times.EV-DO tries to maximize the product of the throughputs of the users, where the throughputs are computed in a given time window. In the present example, let K=number of users $t_c$=scheduler time constant $\gamma_i(t)$=SNR of user i $R_i(t)$=data rate for user i at time t $T_i(t)$=average throughput of user i at time t $$T_i(t+1) = \left(1 - \frac{1}{t_c}\right)T_i(t) + \frac{1}{t_c}R_i(t)$$

$\alpha_i(t) \in [0,1]$=fraction of power allocated to user i at time t $f_i(t)$=1 (user I chosen as the strong user—high SNR user), where 1(.) is the indicator function $g_i(t)$=1 (user I chosen as the weak user—low SNR user)

C(SNR)=capacity as a function of SNR $$R_i(t) = [f_i(t) + g_i(t)]C\left[\frac{\alpha_i(t)\gamma_i(t)}{(1-\alpha_i(t))g_i(t)\gamma_i(t)+1}\right]$$

In one embodiment, the scheduling problem that optimizes the proportional fair metric can be formulated as follows:

$$\text{Maximize} \sum_{i=1}^{K} \log[T_i(t+1)],$$

where the optimization variables are $\{\alpha_i(t)\}_{i=1}^{K}$ and are subject to the constraint of being non-zero for at most 2 users.

The solution of this optimization problem requires the computation of the optimum power allocation for each of the possible $\binom{K}{2}$ pairs of users, and then the comparison of the corresponding metrics. While it is possible to solve this problem optimally, various alternative heuristic algorithms as described below may be used which have a much lower computational complexity.

In the present discussion, the problem of choosing the optimal power allocation is considered for a given pair of users, which WLOG named 1 and 2 [what is WLOG?], with $\gamma_1 \geq \gamma_2$. It is assumed that the capacity function has the form C(SNR)=log(1+SNR/G), where $G \geq 1$ is some constant that accounts for losses in a practical coding scheme. Letting $.\alpha_1=\alpha$ and $\alpha_2=(1-\alpha)$, the respective data rates are achieved as follows:

$$R_1(\alpha) = \log\left(1 + \frac{\alpha\gamma_1}{G}\right)$$

$$R_2(\alpha) = \log\left(1 + \frac{(1-\alpha)\gamma_2}{(\alpha\gamma_2+1)G}\right).$$

Accordingly, the function to maximize is as follows:

$$f(\alpha)=\log(T_1+R_1(\alpha)\Delta t)+\log(T_2+R_2(\alpha)\Delta t),$$

where $\Delta t=1/(t_c-1)$. Assuming $t_c \gg 1$, $f(\alpha)$ can be approximated as $$f'(\alpha) = \frac{R_1'(\alpha)}{T_1}\Delta t + \frac{R_2'(\alpha)}{T_2}\Delta t,$$

which can be set equal to zero and solved for $\alpha$. The resulting quadratic expression $a\alpha^2+\beta\alpha+c=0$ has the following coefficients:

$$a = \gamma_2^2\left(1-\frac{1}{G}\right)$$

$$b = 2\gamma_2 - \frac{T_1}{T_2}\frac{\gamma_2+\gamma_2^2}{G} + \frac{\gamma_2(\gamma_2-1)}{G}$$

$$c = 1 + \frac{\gamma_2}{G} - \frac{T1}{T2}\frac{\gamma_2+\gamma_2^2}{\gamma_1}$$

and can be solved to obtain 2 values of $\alpha$. These 2 values together with 0 and 1 are tested for optimality in the objective function $f(\alpha)$. It should be noted that $\alpha[0,1]$, so any value that falls out of the interval is discarded.

Continuing with the present discussion, the following heuristic algorithms may be used to solve the above optimization problem in an approximate way:

Heuristic Algorithm 1

In one embodiment of the invention, the following algorithm or method may be used to select users and schedule data transmissions to optimize a given performance metric (e.g., proportional fair metric):

Fix a threshold .theta. that is used to separate strong users (e.g., users having high SNR) and weak users (e.g., user having low SNR). For example, .theta. can be chosen in the range from 0 to 10 dB.

At each time t separate the K users into 2 groups by comparing their current $\gamma_i(t)$ to the threshold $\theta$.

Select one user from each group using an established selection algorithm (e.g., the standard proportional fair algorithm).

Choose the power allocation $\alpha$. between the 2 chosen users as described above.

The algorithm/method described above is used to schedule at each time interval t 2 users with asymmetric channel conditions so as to maximize the throughput improvement achieved by superposition coding (SC). At the same time, this algorithm is fair in the proportional fair sense by choosing the user of each group using the proportional fair algorithm, and choosing the power allocation that maximizes the proportional fair metric.

Heuristic Algorithm 2

In another embodiment of the invention, the following algorithm/method can be used to select users and schedule data transmissions to optimize a given performance metric (e.g., proportional fair metric):

Select one user out of the K users using the proportional fair algorithm.

Sequentially consider a second user from the remaining K−1 users and compute the optimal power allocation .alpha. as described above.

Select a second user to maximize f(a) as defined above.

As it can be seen from the above description, this algorithm chooses the first user in a fair way (in a proportional fair sense) and then based on this first choice, chooses the second user optimally according to the proportional fair metric.

Heuristic Algorithm 3

In yet another embodiment of the invention, the following algorithm or method may be used to select users and schedule data transmissions to optimize a given performance metric (e.g., proportional fair metric):

Select one user (first user) out of the K users using the proportional fair algorithm.

Select second user from the remaining K−1 users to maximize the metric $R_i/\langle R_i \rangle$ where $\langle R_i \rangle$ is an average rate computed using an IIR order 1 filter with time constant $t_c$.

Choose power allocation .alpha. as described above.

In this case, the choice of the first user maximizes fairness while the choice of the second user is made to exploit multi-user diversity gain by selecting a user with a good channel condition. Fairness is again achieved by choosing the power allocation a to maximize the proportional fair metric.

Figure 8:
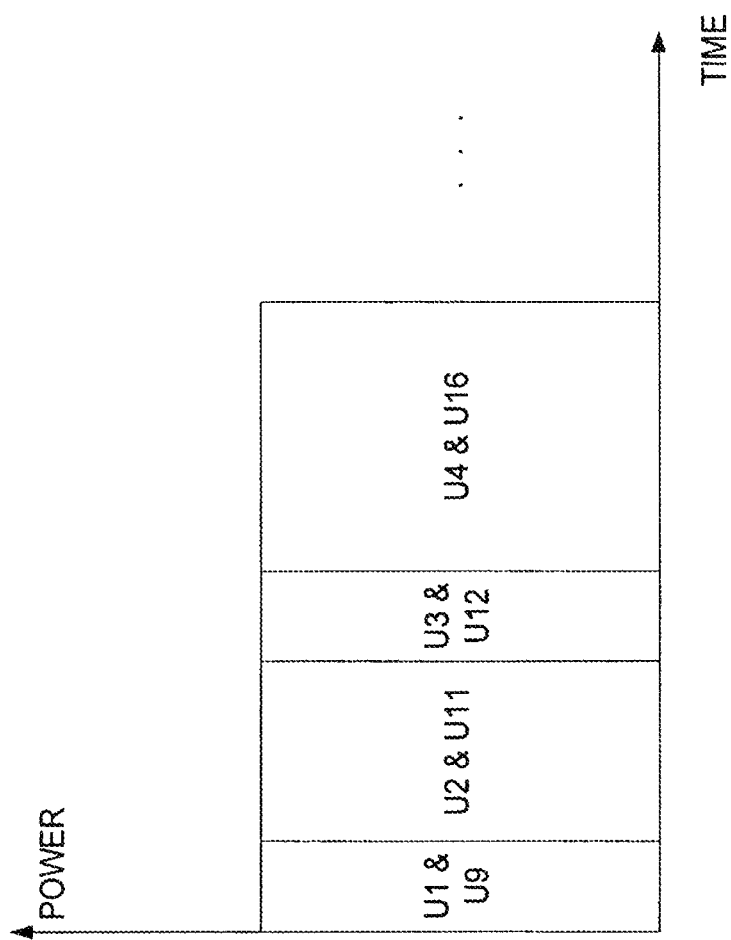
FIG. 8 is a diagram illustrating a forward link transmission scheme operated in accordance with one embodiment of the present invention.

FIG. 8 is a diagram illustrating a transmission scheme on the forward link in accordance with one embodiment of the present invention. In contrast with the conventional TDM scheduling and transmission scheme mentioned above (e.g., the forward link TDM scheduling and transmission in the current IS-856 system), a system in accordance with one embodiment of the invention can schedule data transmission for multiple (e.g. two) users at any given time to improve the system throughput and performance. As shown in FIG. 8, for any given time interval, the system selects and schedules data transmission for two users as described above. Instead of wasting a significant amount of bandwidth to serve one user at a time, especially those users with low SINR, the system in various embodiments of the invention selects and schedule multiple (e.g., two) users for data transmission to optimize a given performance metric (e.g., the proportional fair metric). For example, by selecting two users, one with very high SINR and another with low SINR and transmitting to these two users simultaneously, the base station avoids the need to partition its bandwidth between the two users. Thus, the base station resources are more fully utilized and the system throughput is significantly improved. Referring again to the example shown in FIG. 8 in which two users are selected in any given time interval, user 1 and user 9 are served during time interval T1, user 2 and user 11 are served during time interval T2, and so on.

In one embodiment, as described herein, after the scheduler has selected multiple (e.g., two) users to receive data transmissions from the base station, a multi-user packet is constructed which carries higher layer data for the multiple users. In one embodiment, the multi-user packet (called first packet in this example) contains application data for one of the users (e.g., the user with low SINR) and control information (signaling data) for the other users (users with higher SINR). Another packet (called second packet in this example) is then super-imposed upon the multi-user packet. The second packet contains the application data for the user having SINR. In one embodiment, the second packet is coded so that it behaves like random interference with respect to the multi-user packet.

Figure 9:
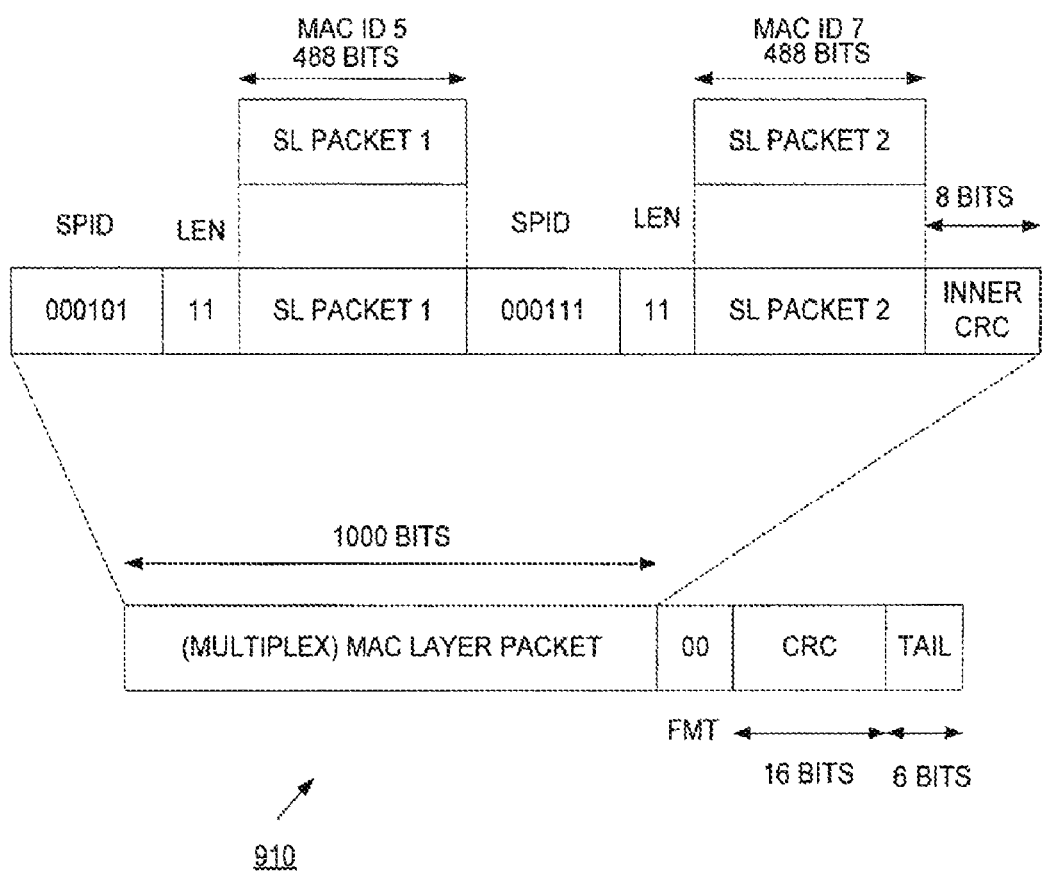
FIG. 9 shows an example of a multi-user packet in accordance with one embodiment of the present invention.

FIG. 9 shows an example of a multi-user packet in accordance with one embodiment of the present invention. Various formats of multi-user packets are described in commonly assigned U.S. patent application Ser. No. 10/368,887, entitled "Variable Packet Lengths for High Packet Data Rate Communications," filed Feb. 3, 2003. As shown in FIG. 9, the multi-user packet 910 is a single physical layer packet which contains higher layer payloads addressed to multiple users. In this example, the multi-user packet 910 contains multiplexed MAC layer packet, format field (FMT), CRC, and tail bits. In one embodiment, the FMT value (e.g., "00") is used to indicate that the physical layer (PL) packet is a multiplexed packet. The MAC layer packet is formed from two Security Layer (SL) packets and an inner CRC. Each SL packet has a corresponding MAC ID value (e.g., 5 for SL Packet 1 and 7 for SL Packet 2. Each SL packet is appended with a Sub-Packet Identification (SPID) field and a LENgth indicator (LEN) field. It should be understood by one skilled in the art that this is just one example of various formats that may be used to construct a multi-user packet and that the teachings of the present invention should not be limited to any particular format or means used in constructing a multi-user packet which contains higher payloads addressed to different users.

Figure 10:
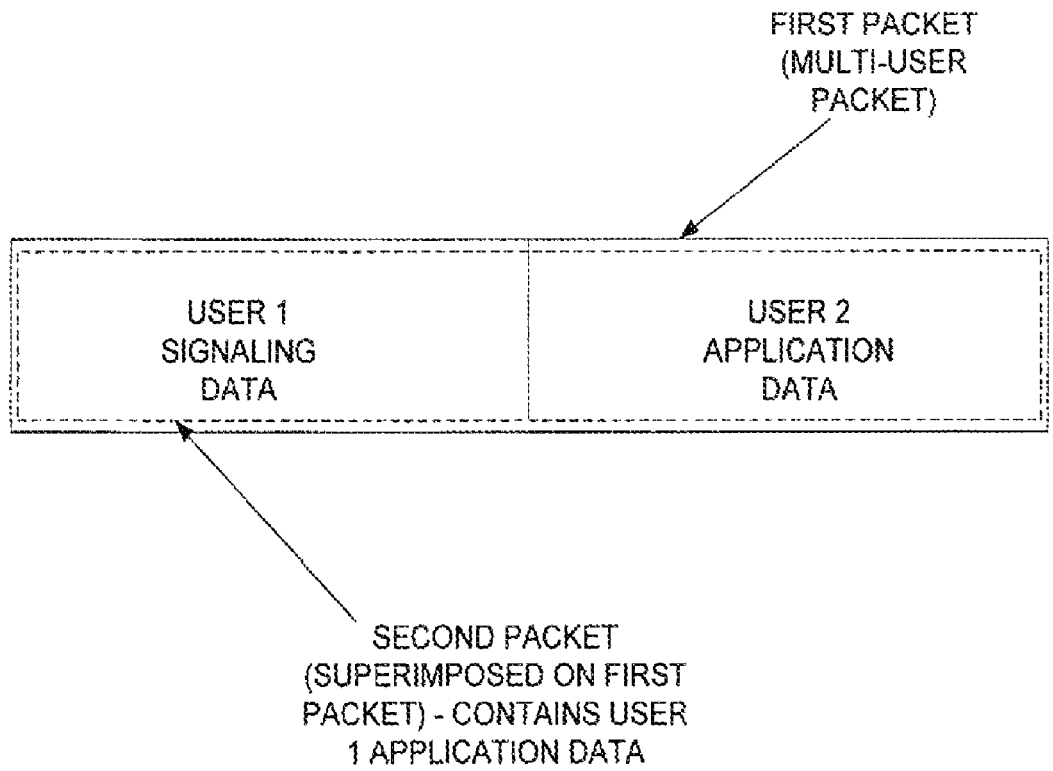
FIG. 10 shows an example of a multi-user packet upon which another packet is superimposed.

FIG. 10 shows an example of a multi-user packet upon which another packet is superimposed. As shown in FIG. 10, the multi-user packet in this case is a single physical layer packet which contains higher payloads for two users (e.g., user 1 with high SINR and user 2 with low SINR). In this example, the multi-user packet (also referred to as first packet in this example) contains application data for user 2 and signaling data for user 1. In one embodiment, signaling data or control information addressed to user 1 may contain coding, modulation, and scrambling parameters, etc., associated with another physical layer packet (also referred to as second packet in this example) that is superimposed on the multi-user packet and transmitted simultaneously with the multi-user packet. The multi-user packet is constructed and sent at a data rate which is low enough so that both users can demodulate. Upon receipt of the signaling data embedded in the multi-user packet, the high SINR user subtracts the contribution of the multi-user packet from the received signal, and uses the resulting signal to extract the second packet, whose encoding parameters were specified by the signaling data. Thus, the low SINR user is served by the bulk of the multi-user packet, while the high SINR user is served by the second packet that was superimposed on the multi-user packet.

Figure 11:
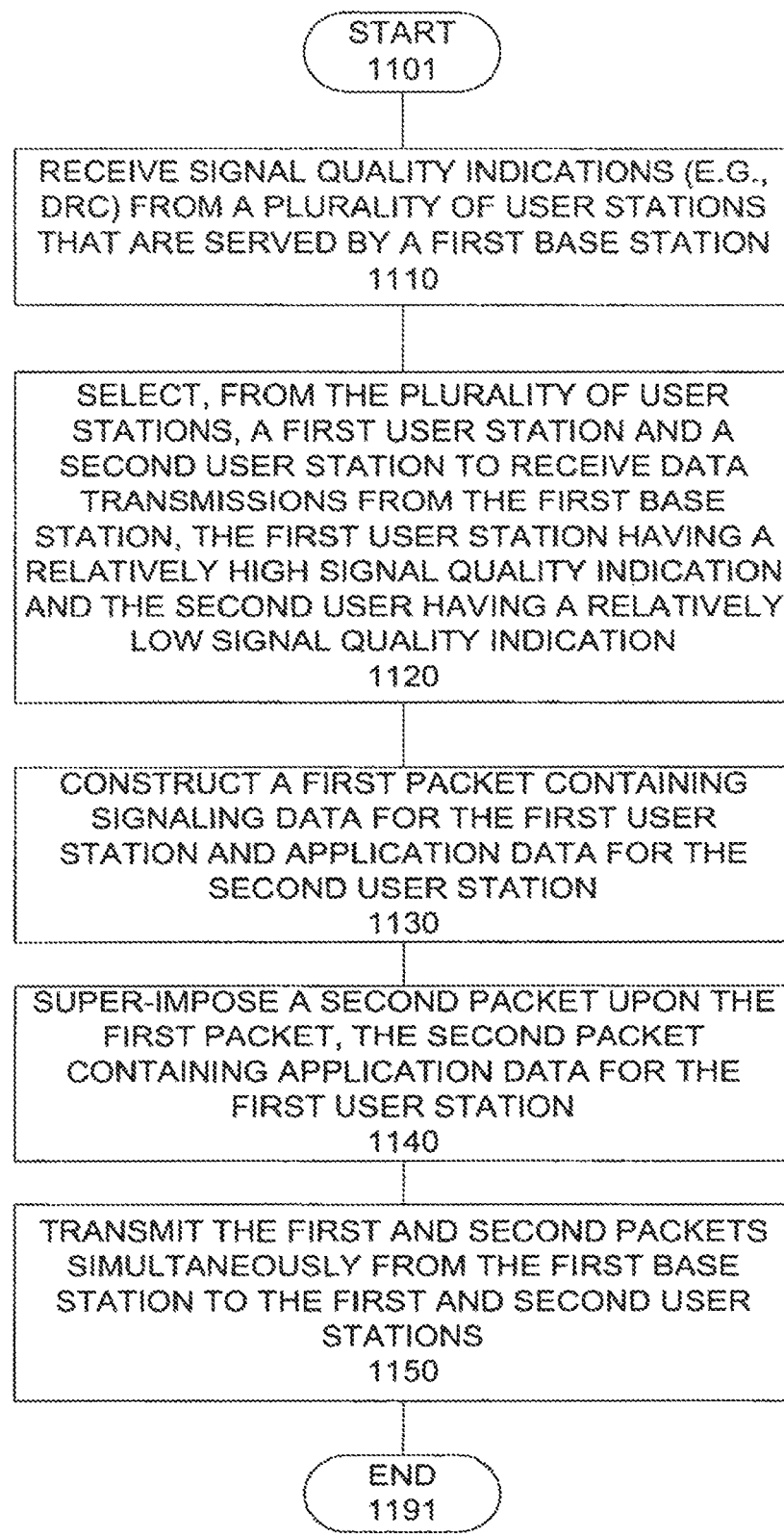
FIG. 11 is a flow diagram of a method for data transmission in a wireless communication system, in accordance with one embodiment of the present invention.

FIG. 11 is a flow diagram of a method for data transmission in a wireless communication system, in accordance with one embodiment of the present invention. As described in FIG. 2 above, the communication system in this example may include one or more base stations. Each base station may serve a number of user stations. At block 1110, signal quality indications are received from one or more user stations that are being served by a first base station. As mentioned above, each user station may measure signal quality of signals received from the first base station and transmit a request for a particular transmission rate (e.g., a DRC message) based on the measured signal quality to the first base station. Again, in other embodiments, the user stations may communicate signal quality measurements to the base station in other formats (e.g., quantized SINR values, etc.). In one embodiment, the signal quality indications (e.g., DRC messages) received from the user stations are used by a scheduler/controller to select multiple stations (e.g., a first user station and a second user station) to receive data transmissions from the first base station (at block 1120). As mentioned above, various algorithms or methods may be used to select the multiple (e.g., two) user stations in order to optimize a given performance metric (e.g., the proportional fair metric). In one embodiment, one of the two user stations selected (e.g., the first user station) has a relatively high signal quality and the other user station (e.g., the second user station) has a relatively low signal quality. Again, in various embodiments of the present invention, other types of information may also be taken into consideration in selecting the user stations. Such information may include, for example, queue information and quality of service (QoS) information. At block 1130, a multi-user packet (called first packet in this example) is constructed which contains control information or signaling data for the first user station and application data for the second user station. At block 1140, a second packet containing application data for the first user station is super-imposed upon the first packet. At block 1150, the first and second packets are transmitted simultaneously from the first base station to the first and second user stations.

Figure 12:
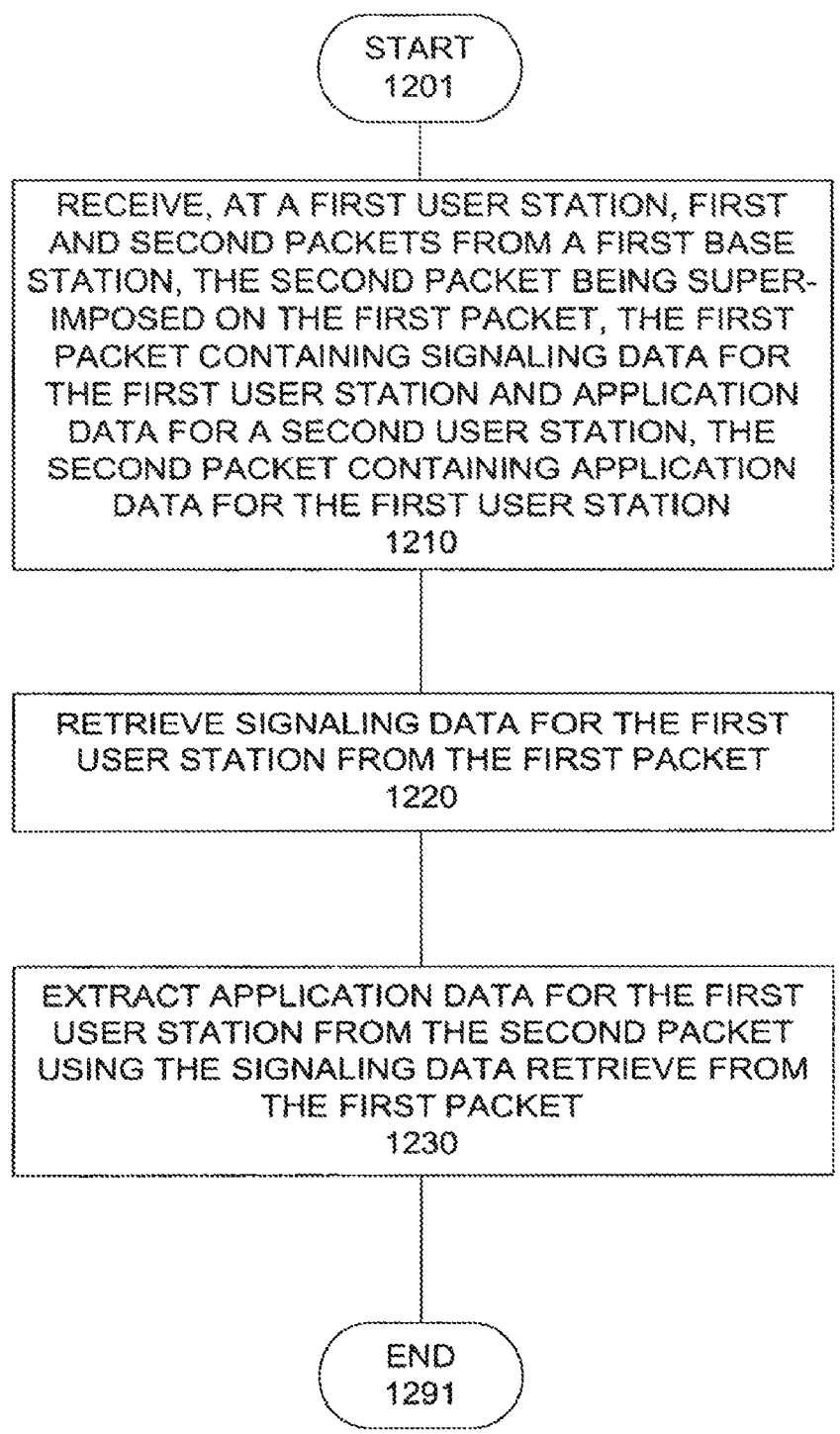
FIG. 12 is a flow diagram of a method for data processing in a wireless communication system, in accordance with one embodiment of the present invention.

FIG. 12 is a flow diagram of a method for data processing in a wireless communication system, in accordance with one embodiment of the present invention. At block 1210, first and second packets transmitted from a first base station is received at a first user station. The first packet is a multi-user packet containing signaling data for the first user station and application data for a second user station. The second packet contains application data for the first user station and is superimposed upon the first packet. In one embodiment, the signaling data in the first packet indicates the coding, modulation, and/or scrambling parameters of the second packet. At block 1220, signaling data for the first user station is retrieved from the first packet. In one embodiment, upon receiving the signaling data embedded in the multi-user packet, the first user station subtracts the contribution of the multi-user packet from the received signal. At block 1230, the first user station uses the signaling data retrieved from the first packet to extract the second packet.

Again, it should be understood and appreciated by one skilled in the art that the teachings of the present invention can be applied to cases where more than users are selected to receive data transmission from the base station in any given time interval. In the general case, the multi-user packet is sent at a data rate indicated by the packet preamble, and is decoded by all users whose SNR is sufficient to decode the packet. Upon successful decoding, the users parse the physical layer data to extract any higher layer payload that may be addressed to them, and discard the rest of the physical layer packet.

For example, let 1, 2, . . . , K denote the users who are currently scheduled by the superposition coding scheduling, in the decreasing order of channel SNR. In one embodiment, the codeword $c_K$ that is meant for the user with the lowest SNR is used to encode a multi-user packet. In this example, the multi-user packet is used to carry application data for the $K^{th}$ user, as the well as control information for other users, who are being served simultaneously, through superposition coding. As mentioned above, the control information may be used to specify the identity of the other users being served, as well as the coding, modulation and scrambling parameters associated with the other codewords that are being superimposed with the codeword $c_K$. Once the users with channel SNR better than that of the lowest-SNR user decode the codeword $c_K$, the control information contained in the packet enables the other scheduled users to successively decode and interference-cancel the remaining packets that are superimposed, until they decode the packet that contains application data meant for them.

Thus, in various embodiments of the invention as described in the example above, there can be multiple (e.g., M packets) superimposed together. In one embodiment, the lowest level packet may contain control/signaling information about all the higher level packets. In this case, only the lowest level packet needs to be a multi-user packet. The other packets may be either single user packets or multi-user packets, depending on various applications and implementations of the invention. Once the superimposed M packets are received, they can be decoded as described above by the respective users to extract the application information intended for them.

Alternatively, in another embodiment, the multiple packets may be superimposed together as follows. A packet at each level may contain control/signaling information (e.g., coding, modulation, block-length, etc.) about the packet at the next higher level. In this embodiment, the lower level packets are multi-user packets while the packet at the higher level may or may not be a multi-user packet. As an example, the highest level packet may contain application data for multiple users, at high SNR.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for processing data in a communication system, comprising:
   using a receiver for receiving indications of signal quality associated with a plurality of user stations;
   selecting a first user station and a second user station to receive data based on the indications of signal quality;
   constructing a first packet containing signaling data for the first user station and application data for the second user station;
   superimposing a second packet upon the first packet, the second packet containing application data for the first user station; and
   using a transmitter for transmitting the first and second packets simultaneously to the first and second user stations.

2. The method of claim 1 wherein the second packet is superimposed upon the first packet using superposition coding.

3. The method of claim 2 wherein the signaling data contains information processing parameters to be used by the first user station for processing the application data in the second packet.

4. The method of claim 3 wherein the information processing parameters include coding and modulation parameters.

5. The method of claim 1 wherein the indication of signal quality associated with each user station corresponds to a signal to noise plus interference ratio (SINR).

6. The method of claim 1 further comprising receiving at least one desired data rate supportable by at least one user station of the plurality of user stations.

7. The method of claim 6 wherein the desired data rate is based on the one of the indications of signal quality associated With the at least one user station.

8. The method of claim 7 wherein the indication of signal quality associated with each user station corresponds to the desired data rate requested by the respective user station.

9. The method of claim 1 wherein a table is used to keep track of the indications of signal quality associated with the plurality of user stations.

10. The method of claim 9 wherein the first user station has a relatively higher desired data rate compared to the second user station.

11. The apparatus of claim 1 wherein a table is used to keep track of the indications of signal quality associated with the plurality of user stations.

12. The apparatus of claim 11 wherein the first user station has a relatively higher desired data rate compared to the second user station.

13. A method for processing data in a communication system, comprising:
   using a receiver for receiving indications of signal quality associated with a plurality of user stations;
   selecting, from the plurality of user stations, a set of K user stations to receive data from a base station, based at least in part on the indications of signal quality received; and
   using a transmitter for transmitting multiple packets that are superimposed together from the base station to the K user stations, wherein the multiple packets are superimposed using superposition coding; and wherein a packet at a lower level in the superimposed packets contains control information for a packet at a next higher level in the superimposed packets.

14. The method of claim 13 wherein the packet at the lower level in the superimposed packets comprises a multi-user packet containing application data for a corresponding user and control information for another user at a next higher level.

15. The method of claim 13 wherein a packet at a highest level in the superimposed packets comprises a multi-user packet containing application data for multiple user stations in the set.

16. An apparatus for processing data in a communication system, comprising:
means for receiving indications of signal quality associated with a plurality of user stations;
means for selecting a first user station and a second user station to receive data based on the indications of signal quality;
means for constructing a first packet containing signaling data for the first user station and application data for the second user station;
means for superimposing a second packet upon the first packet, the second packet containing application data for the first user station; and
means for transmitting the first and second packets simultaneously to the first and second user stations.

17. The apparatus of claim 16 wherein the second packet is superimposed upon the first packet using superposition coding.

18. The apparatus of claim 17 wherein the signaling data contains information processing parameters to be used by the first user station for processing the application data in the second packet.

19. The apparatus of claim 18 wherein the information processing parameters include coding and modulation parameters.

20. The apparatus of claim 16 wherein the indication of signal quality associated with each user station corresponds to a signal to noise plus interference ratio (SINR).

21. The apparatus of claim 16 further comprising means for receiving at least one desired data rate supportable by at least one user station of the plurality of user stations.

22. The apparatus of claim 21 wherein the desired data rate is based on the one of the indications of signal quality associated with the at least one user station.

23. The apparatus of claim 22 wherein the indication of signal quality associated with each user station corresponds to the desired data rate requested by the respective user station.

24. An apparatus for processing data in a communication system, comprising:
means for receiving indications of signal quality associated with a plurality of user stations;
means for selecting, from the plurality of user stations, a set of K user stations to receive data from a base station, based at least in part on the indications of signal quality received; and
means for transmitting multiple packets that are superimposed together from the base station to the K user stations, wherein the multiple packets are superimposed using superposition coding; and
wherein a packet at a lower level in the superimposed packets contains control information for a packet at a next higher level in the superimposed packets.

25. The apparatus of claim 24 wherein the packet at the lower level in the superimposed packets comprises a multi-user packet containing application data for a corresponding user and control information for another user at a next higher level.

26. The apparatus of claim 24 wherein a packet at a highest level in the superimposed packets comprises a multi-user packet containing application data for multiple user stations in the set.

27. An apparatus for processing information, comprising:
a controller to select, from a plurality of user stations, at least one user stations to receive data from based at least in part on indications of signal quality associated with the plurality of user stations; and
a transmitter to transmit a plurality of packets superimposed together to the at least one user station, wherein the plurality of packets are superimposed using superposition coding; and
wherein a first packet at a lower level in the superimposed plurality of packets contains control information for a second packet at a next higher level in the superimposed plurality of packets.

28. The apparatus of claim 27 wherein a third packet at the lowest level in the superimposed plurality of packets contains application information for a user station in the plurality of user stations having a lowest level signal quality.

29. The apparatus of claim 28 wherein the third packet further contains control information for at least one other user station in the plurality of user stations.

30. The apparatus of claim 27 wherein the first packet comprises a multi-user packet containing application data for a user station in the plurality of user stations and control information for a different user station at a next higher level.

31. A non-transitory computer-readable medium storing a computer program, wherein execution of the computer program by a computer processor is for:
receiving indications of signal quality associated with a plurality of user stations;
selecting a first user station and a second user station to receive data based on the indications of signal quality;
constructing a first packet containing signaling data for the first user station and application data for the second user station;
superimposing a second packet upon the first packet, the second packet containing application data for the first user station; and
transmitting the first and second packets simultaneously to the first and second user stations.

32. A non-transitory computer-readable medium storing a computer program, wherein execution of the computer program by a computer processor is for:
receiving indications of signal quality associated with a plurality of user stations;
selecting, from the plurality of user stations, a set of K user stations to receive data from a base station, based at least in part on the indications of signal quality received; and
transmitting multiple packets that are superimposed together from the base station to the K user stations, wherein the multiple packets are superimposed using superposition coding, and wherein a packet at a lower level in the superimposed packets contains control information for a packet at a next higher level in the superimposed packets.

33. An apparatus for processing information, comprising:
a controller to select, from a plurality of user stations, a first user station and a second user station to receive data based at least in part on indications of signal quality associated with the plurality of user stations; and a transmitter to transmit a first packet and a second packet simultaneously to the first and second user stations, wherein the first packet contains signaling data for the first user station and application data for the second user station, wherein the second packet is superimposed upon the first packet, and wherein the second packet contains application data for the first user station.

34. The apparatus of claim 33, wherein the second packet is superimposed upon the first packet using superposition coding.

35. The apparatus of claim 34, wherein the signaling data contains information processing parameters to be used by the first user station for processing the application data in the second packet.

36. The apparatus of claim 35, wherein the information processing parameters include coding and modulation parameters.

* * * * *